US007925217B2

(12) United States Patent
Park et al.

(10) Patent No.: US 7,925,217 B2
(45) Date of Patent: Apr. 12, 2011

(54) RECEIVING CIRCUIT AND METHOD FOR COMPENSATING IQ MISMATCH

(75) Inventors: Joonbae Park, Seoul (KR); Kyeongho Lee, Seoul (KR)

(73) Assignee: GCT Research, Inc., Dongjak-gu, Seoul (KR)

( * ) Notice: Subject to any disclaimer, the term of this patent is extended or adjusted under 35 U.S.C. 154(b) by 594 days.

(21) Appl. No.: 11/708,706

(22) Filed: Feb. 21, 2007

(65) Prior Publication Data

US 2007/0202825 A1    Aug. 30, 2007

(30) Foreign Application Priority Data

Feb. 23, 2006    (KR) .................... 10-2006-0017514

(51) Int. Cl.
*H04B 17/00* (2006.01)
*H04B 1/10* (2006.01)

(52) U.S. Cl. ............... 455/67.11; 455/67.14; 455/226.1; 455/296

(58) Field of Classification Search ............... 455/67.11, 455/67.13, 67.14, 226.1–226.4, 283, 295–296, 455/302, 305–306
See application file for complete search history.

(56) References Cited

U.S. PATENT DOCUMENTS

| 5,826,180 | A | * | 10/1998 | Golan | 455/302 |
| 5,949,821 | A | | 9/1999 | Emami et al. | |
| 6,009,317 | A | * | 12/1999 | Wynn | 455/296 |
| 6,330,290 | B1 | * | 12/2001 | Glas | 375/324 |
| 7,035,341 | B2 | * | 4/2006 | Mohindra | 375/261 |
| 7,146,146 | B2 | * | 12/2006 | Masenten et al. | 455/296 |
| 7,151,917 | B2 | * | 12/2006 | Paulus | 455/302 |
| 7,233,629 | B2 | * | 6/2007 | Auranen | 375/316 |
| 7,480,348 | B2 | * | 1/2009 | Nakano | 375/324 |
| 7,580,680 | B2 | * | 8/2009 | Isaac et al. | 455/67.11 |
| 2004/0203472 | A1 | * | 10/2004 | Chien | 455/68 |
| 2005/0008107 | A1 | * | 1/2005 | Brown | 375/343 |
| 2005/0026577 | A1 | * | 2/2005 | Chiu | 455/130 |
| 2006/0111072 | A1 | * | 5/2006 | Kerth et al. | 455/302 |
| 2007/0099570 | A1 | * | 5/2007 | Gao et al. | 455/63.1 |

* cited by examiner

*Primary Examiner* — Simon D Nguyen
(74) *Attorney, Agent, or Firm* — Muir Patent Consulting, PLLC

(57) ABSTRACT

Embodiments of methods receiving circuits and apparatuses compensate for an IQ mismatch using a test signal positioned in a guard band. One embodiment of a method can include converting a sum of a received signal and a test signal positioned in a guard band to a first signal and a second signal of an intermediate frequency or a base band using an IQ mixer, detecting the IQ mismatch using the test signal respectively included in subsequent signals corresponding to the first signal and the second signal and compensating for the detected IQ mismatch using the IQ mismatch.

26 Claims, 13 Drawing Sheets

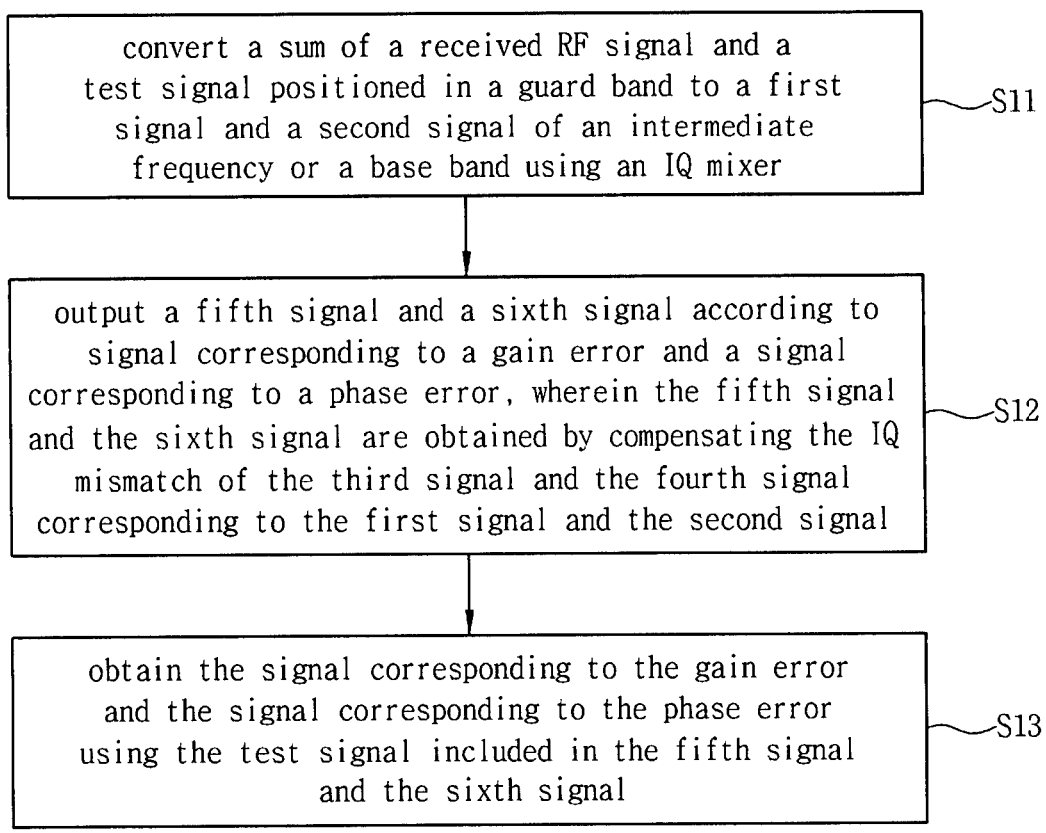

US 7,925,217 B2

RECEIVING CIRCUIT AND METHOD FOR COMPENSATING IQ MISMATCH

BACKGROUND

1. Field

The invention relates to a method and a receiving circuit for compensating for an IQ mismatch.

2. Background

FIG. 1 is a diagram illustrating a conventional receiving circuit. Referring to FIG. 1, the receiving circuit includes an IQ mixer 10, a quadrature signal generator 11, a first and a second variable gain amplifiers 20 and 21, a first and a second band pass filters 30 and 31, a first and a second analog-to-digital converters 40 and 41, and a base band converter 50. A received RF signal is converted to an intermediate frequency signal by the IQ mixer 10. The intermediate signal is then passed through the first and the second variable gain amplifiers 20 and 21 and the first and the second band pass filters 30 and 31, and is converted to a digital signal by the first and the second analog-to-digital converters 40 and 41. The digital signal is then converted to a base band signal by the base band converter 50.

Since the conventional receiving circuit shown in FIG. 1 does not impose an image problem ideally, the conventional receiving circuit is advantageous over a heterodyne type receiving circuit that converts a received RF signal to an intermediate frequency signal and then the intermediate frequency signal to a base band signal without using an IQ mixer. In addition, since the conventional circuit shown in FIG. 1 does not impose 1/f noise and DC offset problems, the conventional receiving circuit is advantageous over a direct conversion receiving circuit that converts a received RF signal to a base band signal using an IQ mixer. The conventional receiving circuit shown in FIG. 1 is gaining popularity due to these advantages.

However, the conventional receiving circuit has various disadvantages. For example, a real IQ mixer has an IQ mismatch. That is, the IQ mixer has a gain error generated because amplitudes of an in-phase (J) signal and a quadrature signal (Q) signal are not exactly the same, and a phase error generated because a phase difference between phases of the in-phase signal and the quadrature signal is not exactly 90°. When the received RF signal is converted to the intermediate frequency signal using the IQ mixer having the IQ mismatch and the intermediate frequency signal is then converted to the base band signal, an image is not completely removed, which can result in a degradation of a performance of a receiver.

The above references are incorporated by reference herein where appropriate for appropriate teachings of additional or alternative details, features and/or technical background.

SUMMARY OF THE INVENTION

An object of embodiments of the invention is to provide a method and a receiving circuit for compensating for IQ mismatch where an IQ mismatch can be compensated for using a test signal positioned in a guard band.

In accordance with a first aspect of the invention, there is provided a receiving circuit that can include a test signal generator to generate a test signal positioned in a guard band, an IQ mixer to multiply an in-phase signal to a sum of the test signal and a received signal to output a first signal of an intermediate frequency or a base band and to multiply a quadrature signal to the sum of the test signal and the received signal to output a second signal of the intermediate frequency or the base band, a first filter and a second filter to respectively receive the first signal and the second signal, a first DAC and a second DAC to respectively receive outputs of the first filter and the second filter and to output a third signal and a fourth signal, an IQ mismatch detector to detect an IQ mismatch generated by the IQ mixer using the test signal included in the third signal and the fourth signal and an IQ compensator to respectively output a fifth signal and a sixth signal that compensate the third signal and the fourth signal for the IQ mismatch according to a result obtained by the IQ mismatch detector.

In accordance with a second aspect of the invention, there is provided a receiving circuit that can include a test signal generator to generate a test signal positioned in a guard band, an IQ mixer to multiply an in-phase signal to a sum of the test signal and a received signal to output a first signal of an intermediate frequency or a base band and to multiply a quadrature signal to the sum of the test signal and the received signal to output a second signal of the intermediate frequency or the base band, a first filter and a second filter to respectively receive the first signal and the second signal, a first DAC and a second DAC to respectively output a third signal and a fourth signal by receiving outputs of the first filter and the second filter, an IQ compensator to compensate the third signal and the fourth signal for an IQ mismatch according to a signal corresponding to a phase error and a signal corresponding to a gain error to respectively output a fifth signal and a sixth signal, and an IQ mismatch detector to detect the signal corresponding to the phase error and the signal corresponding to the gain error using the test signal included in the fifth signal and the sixth signal.

In accordance with a third aspect of the invention, there is provided a receiving circuit that can include a test signal generator to generate a test signal positioned in a guard band, an IQ mixer to multiply an in-phase signal to a sum of the test signal and a received signal to output a first signal of an intermediate frequency or a base band and to multiply a quadrature signal to the sum of the test signal and the received signal to output a second signal of the intermediate frequency or the base band, a first filter and a second filter to respectively receive the first signal and the second signal, a first ADC and a second ADC to respectively output a third signal and a fourth signal by receiving outputs of the first filter and the second filter, an IQ mismatch detector to detect an IQ mismatch generated by the IQ mixer using the test signal included in the third signal and the fourth signal, and an IQ compensator to adjust a gain and a phase of the in-phase signal and the quadrature signal according to the IQ mismatch.

In accordance with a fourth aspect of the invention, there is provided a method for compensating for an IQ mismatch, the method that can include the first signal and the second signal are base band signals respectively, wherein the received signal comprises a prescribed signal, wherein the test signal is positioned in a guard band of the prescribed signal, and wherein the IQ compensator is a quadrature signal generator.

In accordance with a fifth aspect of the invention, there is provided a method for compensating for an IQ mismatch that can include converting a sum of a received signal and a test signal positioned in a guard band to a first signal and a second signal of an intermediate frequency or a base band using an IQ mixer, outputting a fifth signal and a sixth signal according to a signal corresponding to a gain error and a signal corresponding to a phase error, wherein the fifth signal and the sixth signal are obtained by compensating for the IQ mismatch of the third signal and the fourth signal respectively corresponding to the first signal and the second signal, and obtaining the signal corresponding to the gain error and the signal corresponding to the phase error using the test signal included in the fifth signal and the sixth signal.

BRIEF DESCRIPTION OF THE DRAWINGS

Embodiments will be described in detail with reference to the following drawings in which like reference numerals refer to like elements wherein:

FIG. 14 is a diagram illustrating a method for compensating for an IQ mismatch in accordance with an eighth embodiment of the invention.

DETAILED DESCRIPTION

Embodiments of the invention will now be described with reference to the accompanied drawings. Interpretations of the terms and wordings used in description or claims should not be limited to common or literal meanings. Embodiments are provided for the skilled in the art to more completely understand embodiments of the invention.

Figure 1:
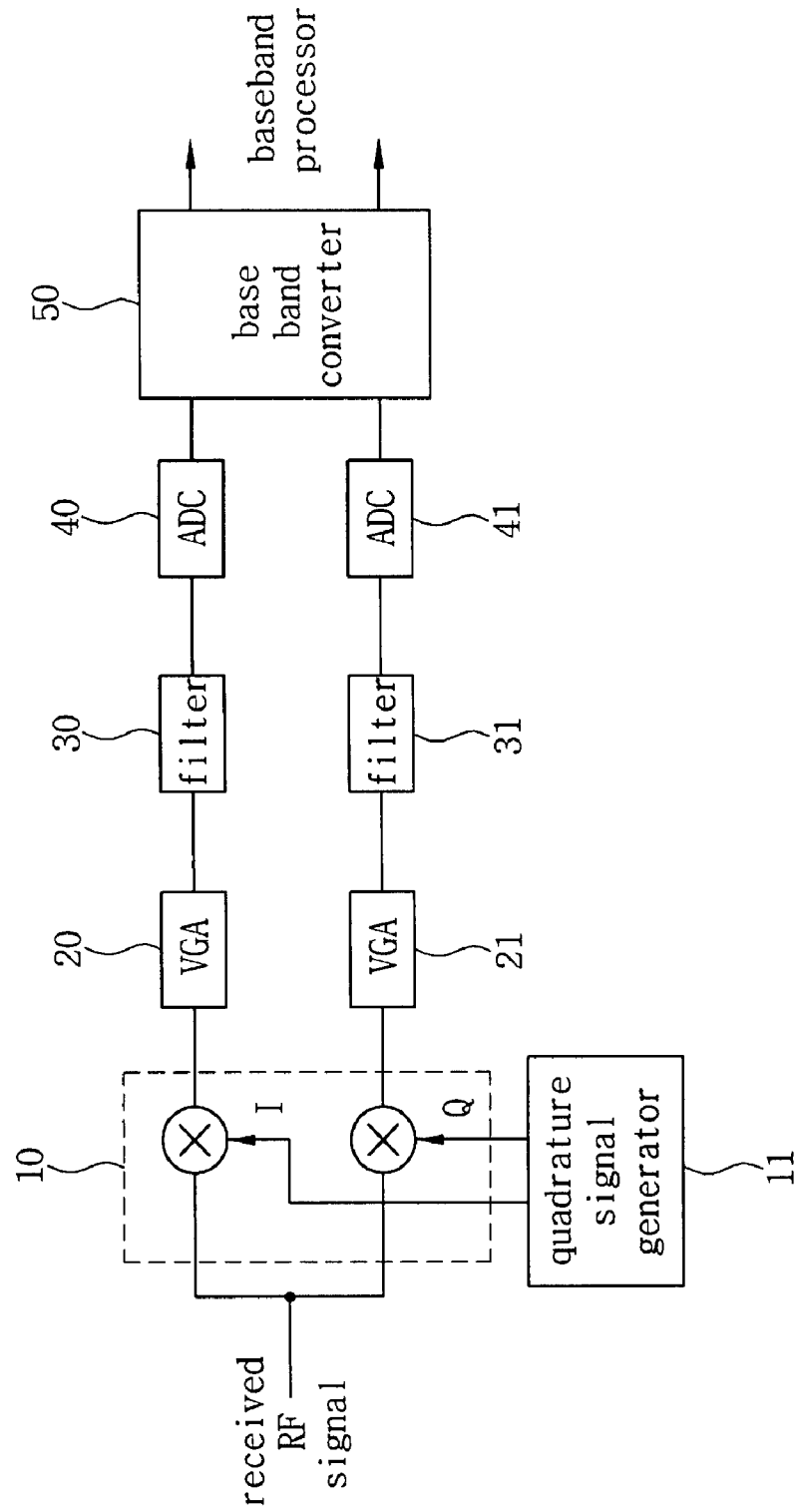
FIG. 1 is a diagram illustrating a conventional receiving circuit.
Figure 2:
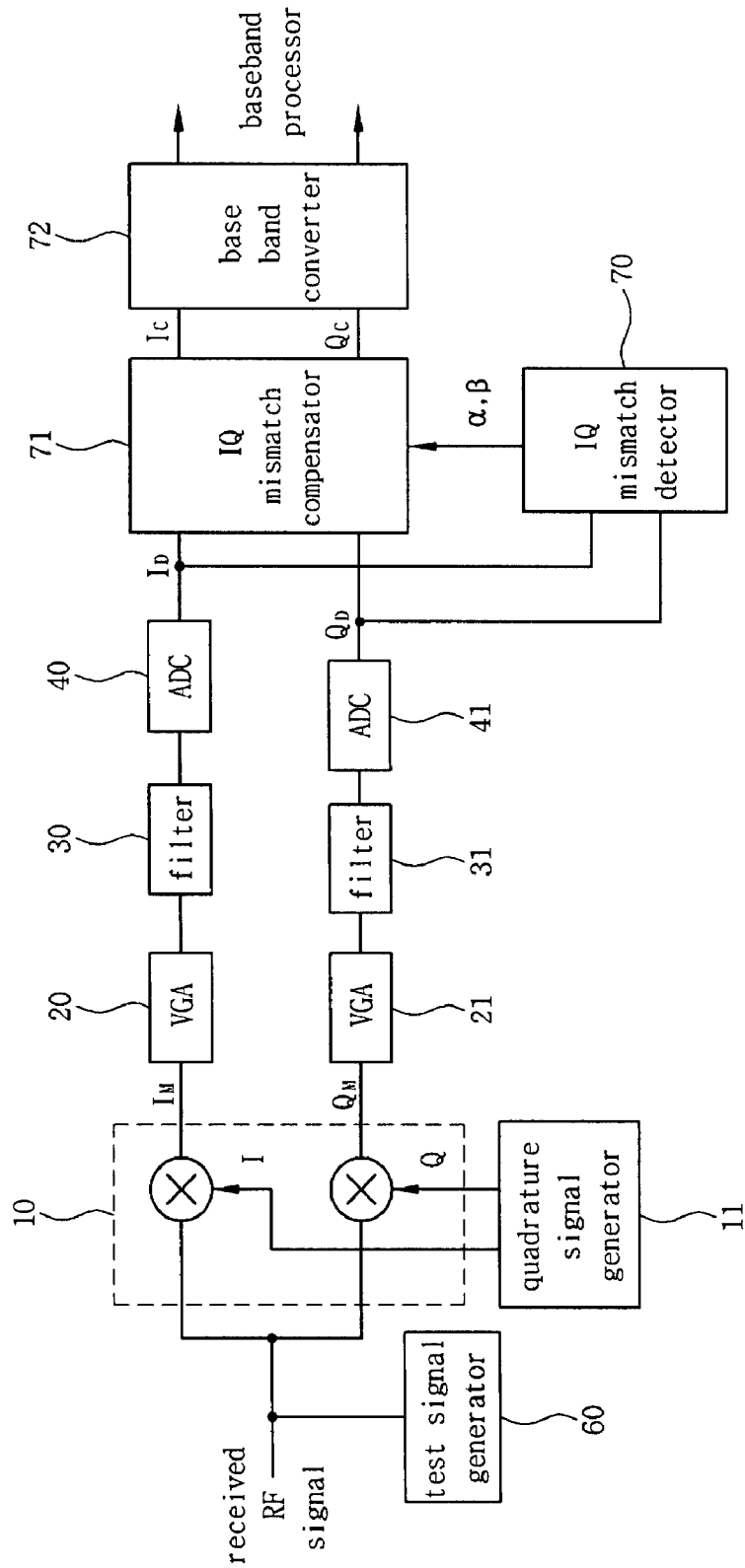
FIG. 2 is a diagram illustrating a receiving circuit in accordance with a first embodiment of the invention, wherein an IQ mixer converts a received RF signal into an intermediate frequency signal.
Figure 3:
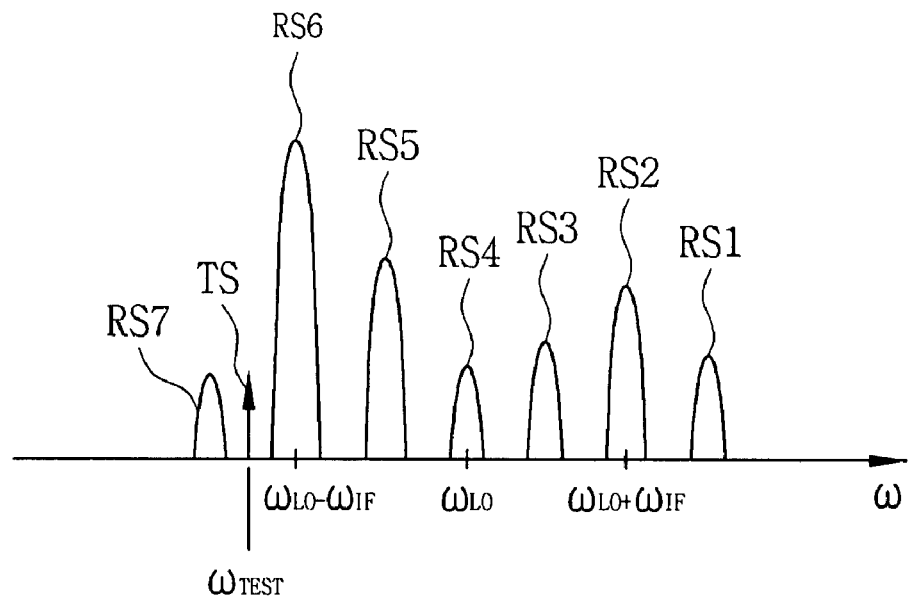
FIG. 3 is diagram illustrating a position of a portion of a received RF signal and a test signal in a frequency domain being inputted into the receiving circuit in accordance with the first embodiment of the invention.

FIG. 2 is a diagram illustrating a receiving circuit in accordance with a first embodiment of the invention. As shown in FIG. 2, an IQ mixer can convert a received RF signal into an intermediate frequency signal. FIG. 3 is diagram illustrating a position of a portion of a received RF signal and a test signal in a frequency domain in accordance with the first embodiment.

Referring to FIG. 2, the receiving circuit can include a test signal generator 60, an IQ mixer 10, a quadrature signal generator 11, a first and a second variable gain amplifiers 20 and 21, a first and a second filters 30 and 31, a first and a second analog-to-digital converters 40 and 41, an IQ mismatch detector 70, an IQ mismatch compensator 71 and a base band converter 72.

The test signal generator 60 can generate a test signal positioned in a guard band. The test signal generator 60 can include a PLL (Phase-Locked Loop) to generate the test signal having an exact frequency (e.g., selected frequency). However, the test signal generator 60 can receive a signal identical to a signal that is inputted to the quadrature signal generator 11, and generate a test signal having a desired frequency using the PLL so that the test signal having a more exact frequency may be generated. When the frequency of the test signal is not exactly set, an image signal by an IQ mismatch of the test signal is positioned on a desired signal such that the test signal acts as an interferer for the desired signal. The test signal is a signal preferably for detecting the IQ mismatch of the IQ mixer 10, an example of which may be represented as Equation 1.

$$TS = A \times \cos(\omega_{TEST} t) + B \times \sin(\omega_{TEST} t) \qquad \text{[Equation 1]}$$

An example of a position of the test signal in a frequency domain is shown in FIG. 3. RS1 through RS7 denote portions of a received RF signal, TS denotes the test signal, $\omega_{LO}$ denote exemplary angular frequencies of an in-phase signal and a quadrature signal inputted to the IQ mixer 10, $\omega_{IF}$ denotes an angular frequency of an intermediate frequency signal outputted by the IQ mixer 10, and $\omega_{TEST}$ denotes an angular frequency of the test signal. Of the portions of the received RF signal, for example, the second received signal and the sixth received signal may be represented as Equation 2.

$$RS2 = C(t) \times \cos(\omega_{LO} + \omega_{IF})t + D(t) \times \sin(\omega_{LO} + \omega_{IF})t$$

$$RS6 = E(t) \times \cos(\omega_{LO} - \omega_{IF})t + F(t) \times \sin(\omega_{LO} - \omega_{IF})t \qquad \text{[Equation 2]}$$

Let the second received signal RS2 be assumed as a desired signal. When the second received signal RS2 is converted to the intermediate frequency signal having the angular frequency of $\omega_{IF}$ via the heterodyne method without using the IQ mixer, the sixth received signal RS6 positioned at $\omega_{LO}-\omega_{IF}$, which is opposite to the second received signal RS2, is also converted to the intermediate frequency signal having the angular frequency of $\omega_{IF}$, thereby acting as an interfering signal to the second received signal RS2. Such problems can be referred to as an image problem. Theoretically, when the second received signal RS2 which is the desired signal, is converted to a base band signal after converting the same to the intermediate frequency signal using the IQ mixer, the image problem may be removed completely. However, the IQ mismatch is generated because of a gain error and a phase error of the in-phase signal and the quadrature signal, and accordingly, the interference by the image is not completely removed. Therefore, the sixth received signal RS6 acts as the interference signal to the second received signal RS2. The test signal TS is positioned in a guard band so as to reduce or prevent the interference between the adjacent received signals as shown in FIG. 3. In a mobile communication system, an entire allocated frequency band is divided into several channels (e.g., RS1 through RS6), and the receiver and the transmitter can carry out a communication using one or more of the channels. In order to easily select one of two adjacent channels, a signal is not transmitted in a predetermined frequency band between the two adjacent channels. The predetermined frequency band between the two adjacent channels where the signal is not transmitted can be referred to as the guard band. Since a relatively small number of RF signals are received in the guard band, a more exact test may be carried out using the test signal TS. When the test signal TS is positioned in the guard band that is away from the sixth received signal RS6, most of the test signal TS is removed by the first and the second filters 30 and 31, and is very difficult to use or cannot be used by the IQ mismatch detector 70. Therefore, it is preferable that the test signal TS is positioned in a guard band of the sixth received signal RS6 (e.g., in a guard band adjacent to a left or a right of the sixth received signal RS6 that is the interference signal) where a relatively small amount of the test signal TS is removed. In addition, the image signal of the test signal TS should be positioned in a guard band of the second received signal RS2 for detection (e.g., exact detection) by the IQ mismatch detector 70 because of a small amount of interference of the received RF signal. Therefore, it is preferable that the image signal of the test signal TS is positioned in the guard band of a desired signal, which is the second received signal RS2. However, embodiments are not intended to be so limited. For example, when the sixth received signal is the desired signal and the angular frequencies of an in-phase signal and a quadrature signal inputted to the IQ mixer 10 are $\omega_{LO}$, the second received signal RS2 is the interference signal, and it is preferable that the test signal is positioned in the guard band of the second received signal RS2.

Still referring to FIG. 2, the IQ mixer 10 can output a first signal $I_M$ obtained by multiplying the in-phase signal to a sum of the test signal and the received signal, and a second signal $Q_M$ obtained by multiplying the quadrature signal to the sum of the test signal and the received signal. For example, the received RF signal can be an RF signal transmitted from an antenna (not shown). The RF signal may be transmitted to the IQ mixer 10 through a matching network (not shown) and a low noise amplifier (LNA, not shown), or through a duplexer (not shown) and the LNA. The quadrature signal generator 11 outputs the in-phase signal I and the quadrature signal Q having a 90° phase difference therebetween. When the gain error and the phase error occur between the in-phase signal I and the quadrature signal Q, the in-phase signal I and the quadrature signal Q may be represented as Equation 3, where $\alpha$ denotes the gain error and $\beta$ denotes the phase error.

$$I=(1+\alpha)\times\cos((\omega_{LO}t+\beta)\approx(1+\alpha)\times\cos\omega_{LO}t-\beta\times\sin\omega_{LO}t$$

$$Q=(1-\alpha)\times\sin(\omega_{LO}t-\beta)\approx(1-\alpha)\times\sin\omega_{LO}t-\beta\times\cos\omega_{LO}t \quad \text{[Equation 3]}$$

The first and the second variable gain amplifiers 20 and 21 amplify the first signal $I_M$ and the second signal $Q_M$.

Preferably, the first and the second filters 30 and 31 are band pass filters. However, embodiments are not intended to be so limited. The first and the second filters 30 and 31 can pass a signal corresponding to a band of the desired signal RS2, which can be converted from a signal being outputted by the first and the second variable gain amplifiers 20 and 21.

The first and the second analog-to-digital converters 40 and 41 respectively output a third signal $I_D$ and a fourth signal $Q_D$, which are converted from the output signals of the first and the second band pass filters 30 and 31.

The IQ mismatch detector 70 can detect the IQ mismatch generated by the IQ mixer 10 using the test signals $I_{D,TEST}$ and $Q_{D,TEST}$ respectively included in the third signal $I_D$ and the fourth signal $Q_D$. For example, the IQ mismatch detector 70 can obtain a signal corresponding to the gain error $\alpha$ and a signal corresponding to the phase error $\beta$ using the test signals $I_{D,TEST}$ and $Q_{D,TEST}$ included in the third signal $I_D$ and the fourth signal $Q_D$. The signal corresponding to the gain error $\alpha$ and the signal corresponding to the phase error $\beta$, which are a result obtained by the IQ mismatch detector, are transmitted to the IQ mismatch compensator 71.

The IQ mismatch compensator 71 outputs a fifth signal $I_C$, and a sixth signal $Q_C$, which can be obtained by compensating the third signal $I_D$ and the fourth signal $Q_D$ according to a result obtained by the IQ mismatch detector 70, to the base band converter 72. The base band converter 72 converts the desired signals included in the fifth signal $I_C$ and the sixth signal $Q_C$, to signals of the base band to be outputted. The signals outputted by the base band converter 72 may be transmitted to a base band processor unit (not shown).

Figure 4:
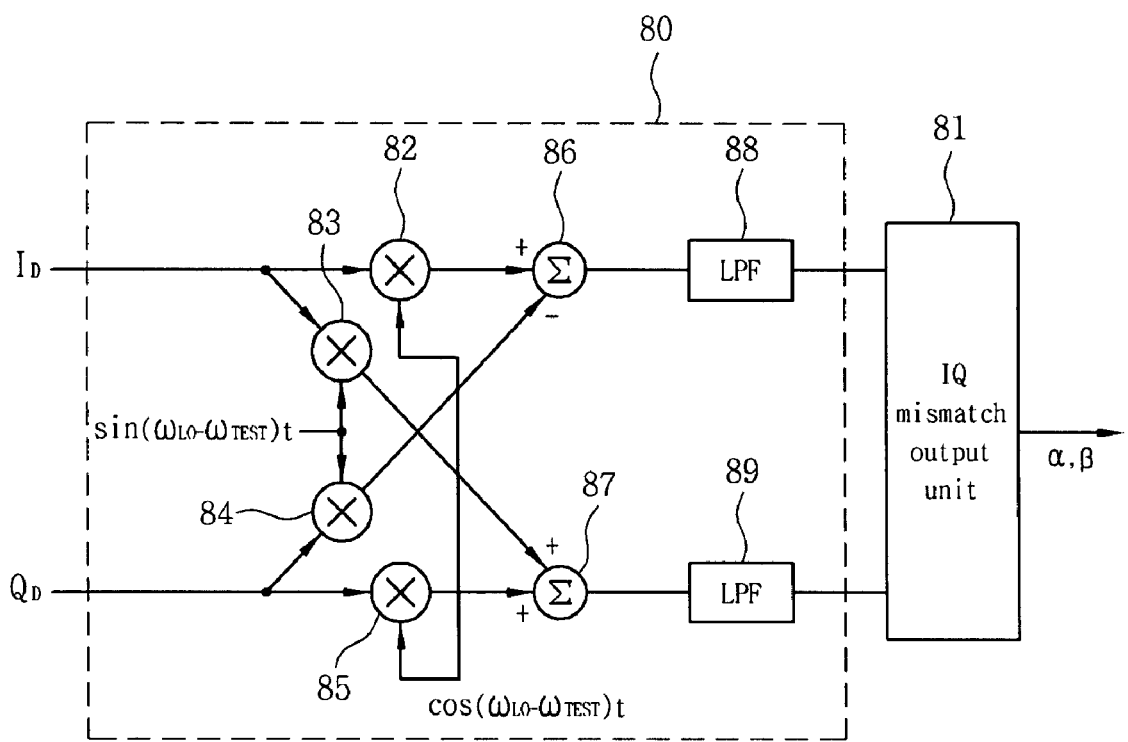
FIG. 4 is a diagram illustrating an example of an IQ mismatch detector shown in FIG. 2.

FIG. 4 is a diagram illustrating an example of an IQ mismatch detector shown in FIG. 2. As shown in FIG. 4, the IQ mismatch detector can include a base band converter 80 and an IQ mismatch output unit 81.

The base band converter 80 converts the test signals $I_{D,TEST}$ and $Q_{D,TEST}$ included in the third signal $I_D$ and the fourth signal $Q_D$ to signals of the base band. For instance, the base band converter 80 may include first through fourth multipliers 82, 83, 84 and 85, a subtractor 86, an adder 87, and a first and a second low pass filters 88 and 89. When the test signals $I_{D,TEST}$ and $Q_{D,TEST}$ included in the third signal $I_D$ and the fourth signal $Q_D$ are approximately expressed as Equation 4, test signals $I_{B,TEST}$ and $Q_{B,TEST}$ after passing the base band converter 80 may be expressed as Equation 5.

$$I_{D,TEST} \approx A\times(1+\alpha)\times\cos(\omega_{LO}-\omega_{TEST})t-B\times(1+\alpha)\times\sin(\omega_{LO}-\omega_{TEST})t-A\times\beta\times\sin(\omega_{LO}-\omega_{TEST})t-B\times\beta\times\cos(\omega_{LO}-\omega_{TEST})t$$

$$Q_{D,TEST} \approx A\times(1-\alpha)\times\sin(\omega_{LO}-\omega_{TEST})t+B\times(1-\alpha)\times\cos(\omega_{LO}-\omega_{TEST})t-A\times\beta\times\cos(\omega_{LO}-\omega_{TEST})t+B\times\beta\times\sin(\omega_{LO}-\omega_{TEST})t \quad \text{[Equation 4]}$$

$$I_{B,TEST} = I_{D,TEST}\times\cos(\omega_{LO}-\omega_{TEST})t - Q_{D,TEST}\times\sin(\omega_{LO}-\omega_{TEST})t \quad \text{[Equation 5]}$$
$$\approx A\times\alpha - B\times\beta$$

$$Q_{B,TEST} = Q_{D,TEST}\times\cos(\omega_{LO}-\omega_{TEST})t + I_{D,TEST}\times\sin(\omega_{LO}-\omega_{TEST})t$$
$$\approx -B\times\alpha - A\times\beta$$

An arithmetic operation of Equation 5 is similar to or identical to an arithmetic operation for converting the desired signal to the base band signal, which will be described later. However, $\cos(\omega_{IF}t)$ and $\sin(\omega_{IF}t)$ are used in the arithmetic operation for converting the desired signal to the base band signal while $\cos(\omega_{LO}-\omega_{TEST})t$ and $\sin(\omega_{LO}-\omega_{TEST})t$ are used in the Equation 5. Since the test signals $I_{B,TEST}$ and $Q_{B,TEST}$ after passing the base band converter 80 are image values generated by the IQ mismatch, their values are zero (or reduced) when the IQ mismatch does not occur, (or is reduced) e.g., when the gain error $\alpha$ and the phase error $\beta$ do not occur. This may be confirmed by substituting $\alpha=0$ and $\beta=0$ in the Equation 5 and obtaining zeroes for the value of the test signals $I_{B,TEST}$ and $Q_{B,TEST}$.

The IQ mismatch output unit 81 obtains the signal corresponding to the gain error $\alpha$ and the phase error $\beta$ from the signals $I_{B,TEST}$ and $Q_{B,TEST}$ that are outputted by the base band converter 80. When A and B is known, the gain error $\alpha$ and the phase error $\beta$ may easily be obtained from the Equation 5.

In addition, the IQ mismatch detector may be embodied by the method disclosed in the U.S. Pat. No. 5,949,821 by Shahriar Emami, titled "Method and Apparatus for Correcting Phase and Gain Imbalances Between In-phase (I) and Quadrature (Q) Components of a Received Signal Based on a Determination of Peak Amplitudes". However, in accordance with embodiments of the invention, the IQ mismatch is obtained using the test signal. Therefore, the IQ mismatch may be obtained by the method disclosed in U.S. Pat. No. 5,949,821 after obtaining the test signals $I_{D,TEST}$ and $Q_{D,TEST}$ included in the third signal $I_D$ and the fourth signal QD using the band pass filters.

Figure 5:
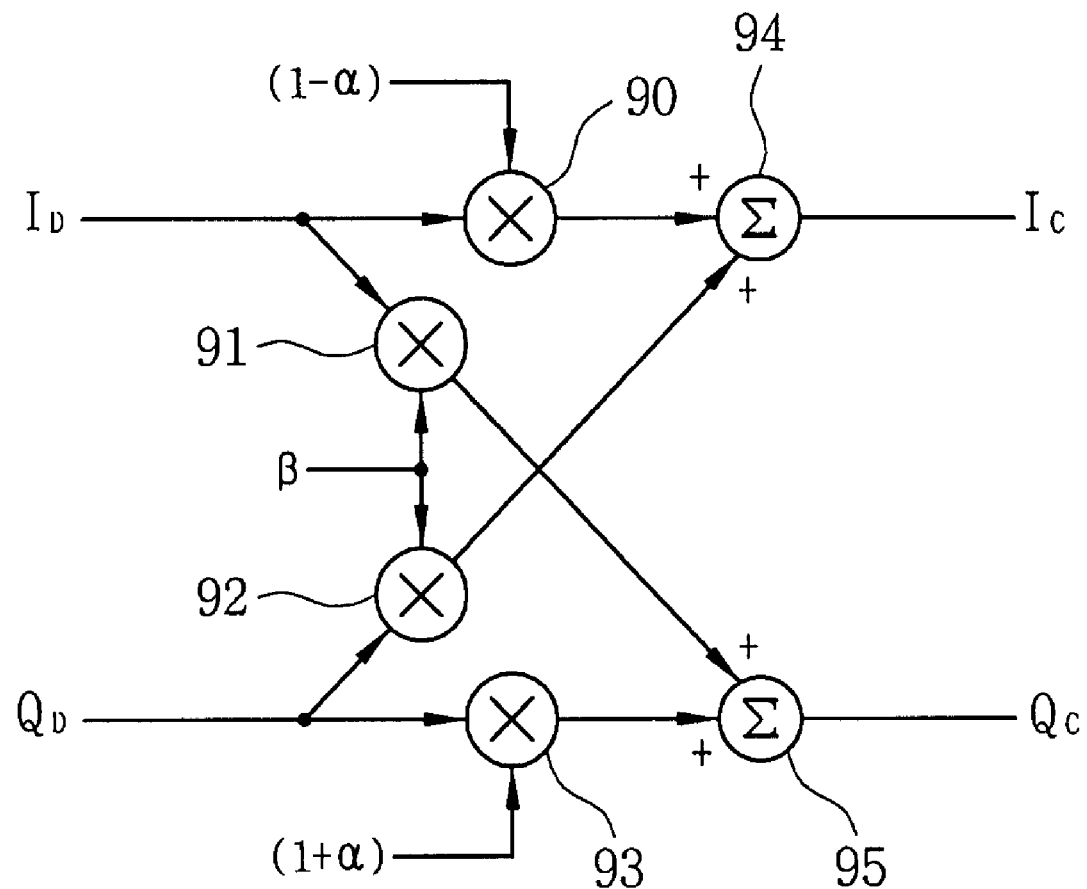
FIG. 5 is a diagram illustrating an example of an IQ mismatch compensator shown FIG. 2.

FIG. 5 is a diagram illustrating an example of an IQ mismatch compensator shown FIG. 2. As shown in FIG. 5, the IQ mismatch compensator can include first through fourth multipliers 90, 91, 92 and 93, and adders 94 and 95.

When desired signals $I_{D,R2}$ and $Q_{D,R2}$ and interference signals $I_{D,R6}$ and $Q_{D,R6}$ included in the third signal $I_D$ and the fourth signal $Q_D$ are approximately expressed as Equation 6, desired signals $I_{C,R2}$ and $Q_{C,R2}$ and interference signals $I_{C,R6}$ and $Q_{C,R6}$ included in the fifth signal $I_C$ and the sixth signal $Q_C$ may be expressed as Equation 7.

$$I_{D,R2} \approx C(t) \times (1+\alpha) \times \cos(\omega_{IF})t + D(t) \times (1+\alpha) \times \sin(\omega_{IF})t + C(t) \times \beta \times \sin(\omega_{IF})t - D(t) \times \beta \times \cos(\omega_{IF})t$$

$$Q_{D,R2} \approx C(t) \times (1-\alpha) \times \sin(\omega_{IF})t + D(t) \times (1-\alpha) \times \cos(\omega_{IF})t - C(t) \times \beta \times \cos(\omega_{IF})t - D(t) \times \beta \times \sin(\omega_{IF})t$$

$$I_{D,R6} \approx E(t) \times (1+\alpha) \times \cos(\omega_{IF})t - F(t) \times (1+\alpha) \times \sin(\omega_{IF})t - E(t) \times \beta \times \sin(\omega_{IF})t - F(t) \times \beta \times \cos(\omega_{IF})t$$

$$Q_{D,R6} \approx E(t) \times (1-\alpha) \times \sin(\omega_{IF})t + F(t) \times (1-\alpha) \times \cos(\omega_{IF})t - E(t) \times \beta \times \cos(\omega_{IF})t + F(t) \times \beta \times \sin(\omega_{IF})t \quad \text{[Equation 6]}$$

$$I_{C,R2} = (1-\alpha) \times I_{D,R2} + \beta \times Q_{D,R2} \approx C(t) \times \cos(\omega_{IF})t + D(t) \times \sin(\omega_{IF})t$$

$$Q_{C,R2} = (1+\alpha) \times Q_{D,R2} + \beta \times I_{D,R2} \approx -C(t) \times \sin(\omega_{IF})t + D(t) \times \cos(\omega_{IF})t$$

$$I_{C,R6} = (1+\alpha) \times I_{D,R6} + \beta \times Q_{D,R6} \approx E(t) \times \cos(\omega_{IF})t - F(t) \times \sin(\omega_{IF})t$$

$$Q_{C,R6} = (1+\alpha) \times Q_{D,R6} + \beta \times I_{D,R6} \approx E(t) \times \sin(\omega_{IF})t + F(t) \times \cos(\omega_{IF})t \quad \text{[Equation 7]}$$

As expressed in Equation 7, since the signals being outputted by the IQ mismatch compensator are substantially similar to or identical to signals when the IQ mismatch approximately does not occur, it may be confirmed that the IQ mismatch compensator compensates for the IQ mismatch.

Figure 6:
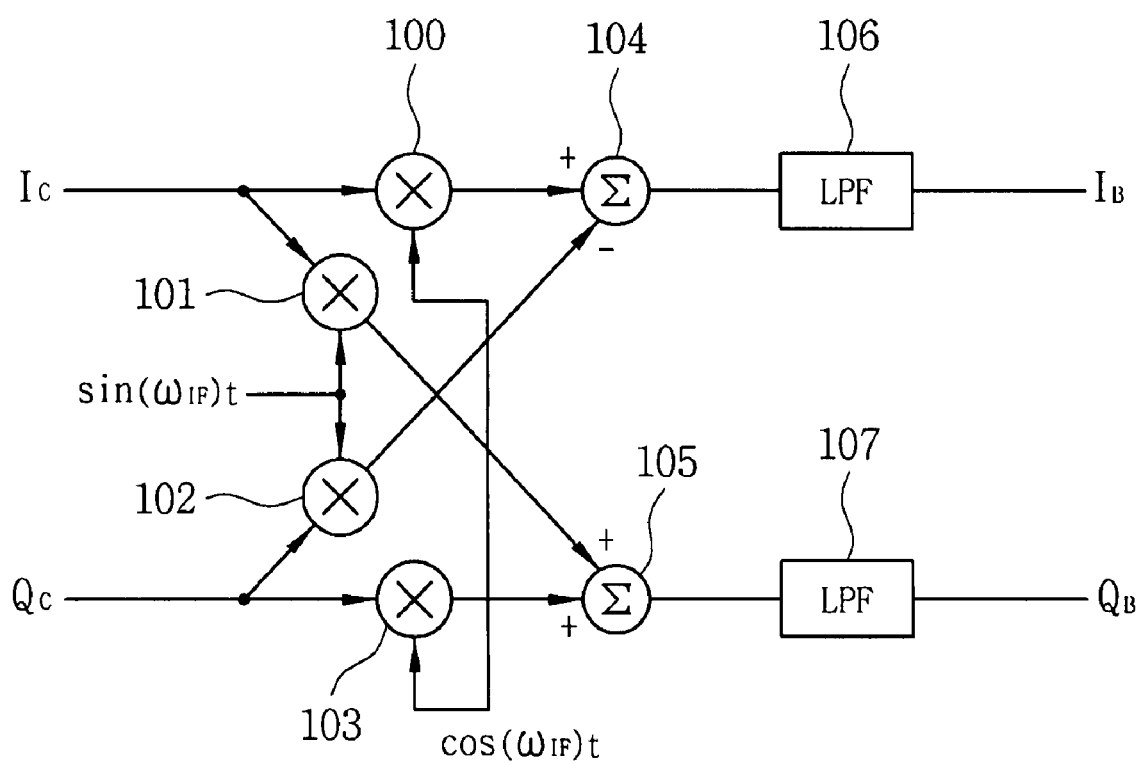
FIG. 6 is a diagram illustrating an example of a base band converter shown FIG. 2.

FIG. 6 is a diagram illustrating an example of the base band converter shown FIG. 2. As shown in FIG. 6, the base band converter may include first through fourth multipliers 100, 101, 102 and 103, a subtractor 104, an adder 105, and first and second low pass filters 106 and 107.

When the desired signals $I_{C,R2}$ and $Q_{C,R2}$ and interference signals $I_{C,R6}$ and $Q_{C,R6}$ included in the fifth signal $I_C$ and the sixth signal $Q_C$ may approximately expressed as Equation 7, signals $I_{B,R2}$ and $Q_{B,R2}$ after passing through the base band converter may be expressed as Equation 8.

$$I_{B,R2} = I_{C,R2} \times \cos(\omega_{IF})t - Q_{C,R2} \times \sin(\omega_{IF})t \approx C(t)$$

$$Q_{B,R2} = Q_{C,R2} \times \cos(\omega_{IF})t + I_{C,R2} \times \sin(\omega_{IF})t \approx D(t)$$

$$I_{B,R6} = I_{C,R6} \times \cos(\omega_{IF})t - Q_{C,R6} \times \sin(\omega_{IF})t \approx 0$$

$$Q_{B,R6} = Q_{C,R6} \times \cos(\omega_{IF})t + I_{C,R6} \times \sin(\omega_{IF})t \approx 0 \quad \text{[Equation 8]}$$

As expressed in Equation 8, when the fifth signal $I_C$ and the sixth signal $Q_C$ of the intermediate frequency, which are obtained by compensating for the IQ mismatch, are converted to the signals of the base band frequency, C(t) and D(t), which are the desired signals $I_{C,R2}$ and $Q_{C,R2}$ of the base band, may be obtained, and the image due to the IQ mismatch of the interference signal is zero (e.g., reduced).

Figure 7:
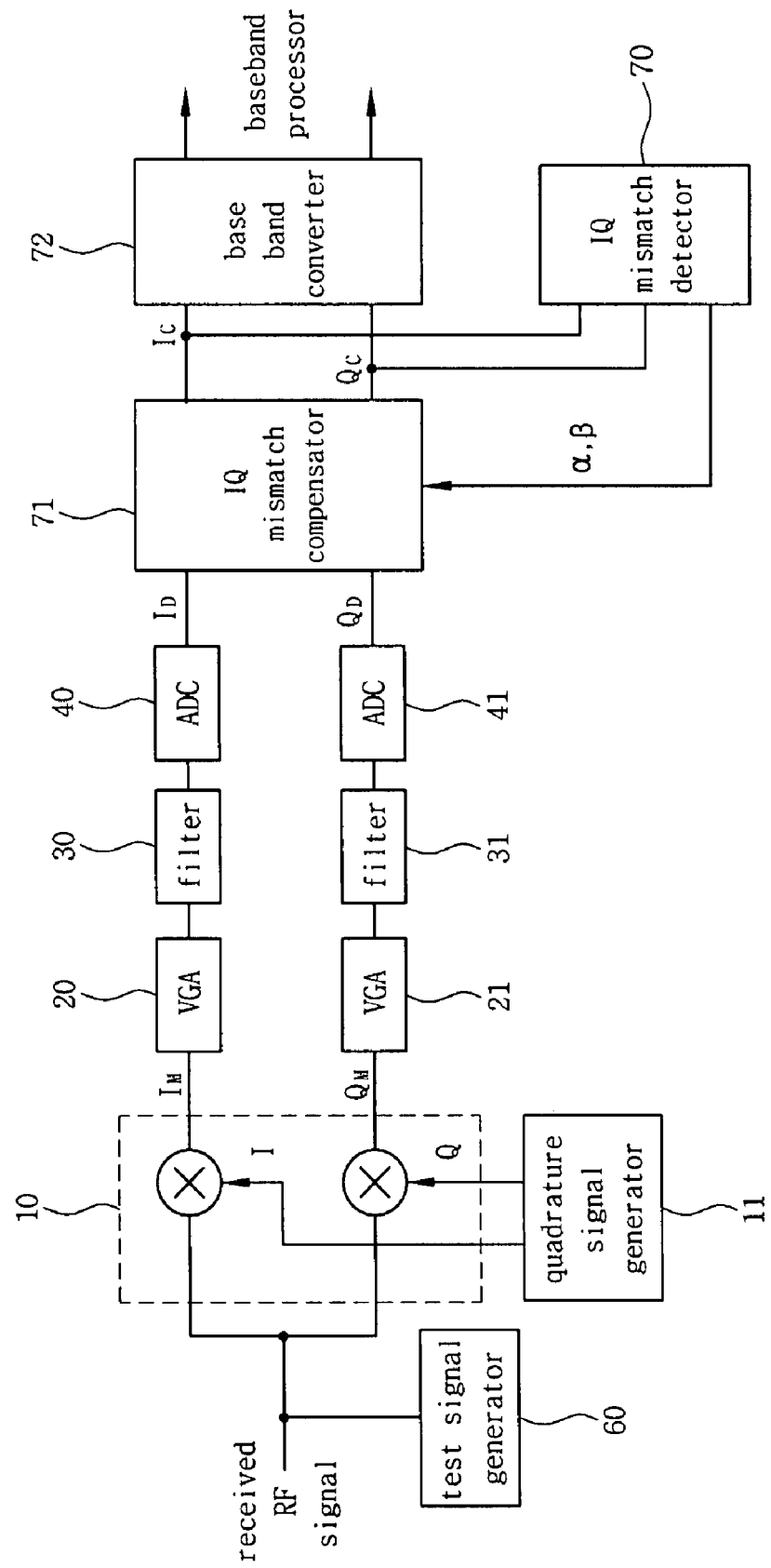
FIG. 7 is a diagram illustrating a receiving circuit in accordance with a second embodiment of the invention.

FIG. 7 is a diagram illustrating a receiving circuit in accordance with a second embodiment according to the invention. Contrary to the first embodiment of FIG. 2 where the third signal $I_D$ and the fourth signal $Q_D$ are inputted to the IQ mismatch detector 70, the fifth signal $I_C$ and the sixth signal $Q_C$ can be inputted to the IQ mismatch detector 70 in accordance with the second embodiment. Since other configurations of the receiving circuit in accordance with the second embodiment are similar or identical to that of the first embodiment, a detailed description is omitted here.

Figure 8:
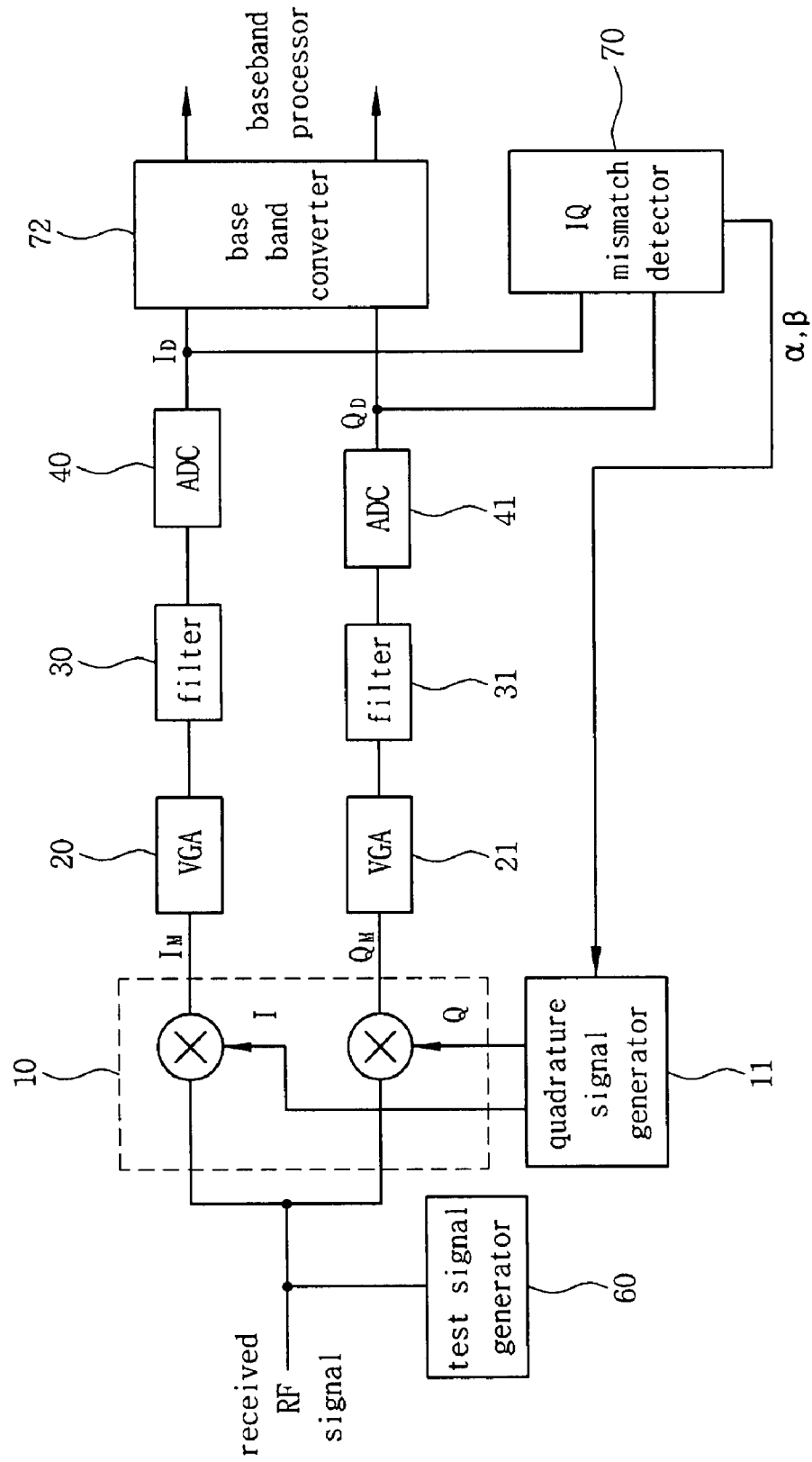
FIG. 8 is a diagram illustrating a receiving circuit in accordance with a third embodiment of the invention.

FIG. 8 is a diagram illustrating a receiving circuit in accordance with a third embodiment of the present invention. Contrary to the first embodiment according to the invention where the IQ mismatch is compensated for using the IQ mismatch compensator 71, the IQ mismatch can be compensated for by the quadrature signal generator 11 in accordance with the third embodiment. Therefore, in accordance with the receiving circuit of the third embodiment, the signals corresponding to the gain error $\alpha$ and the phase error $\beta$ are transmitted to the quadrature signal generator 11, and the quadrature signal generator 11 compensates for the gain error $\alpha$ and the phase error $\beta$ of the in-phase signal I and the quadrature signal Q according to the signals corresponding to the gain error $\alpha$ and the phase error $\beta$. Since other configurations of the receiving circuit in accordance with the third embodiment are similar or identical to that of the first embodiment, a detailed description is omitted here.

Figure 9:
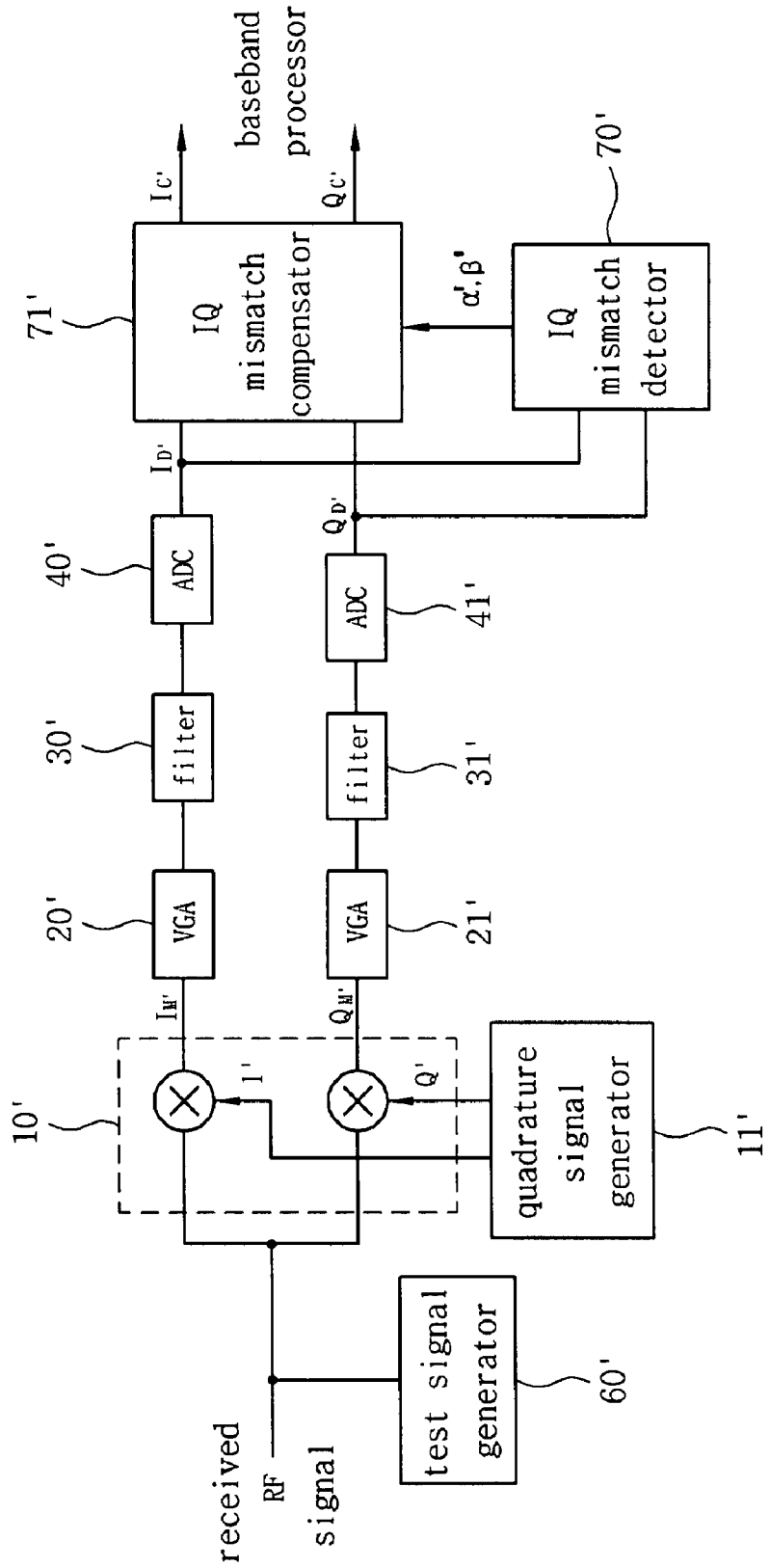
FIG. 9 is a diagram illustrating a receiving circuit in accordance with a fourth embodiment of the invention, wherein an IQ mixer converts a received RF signal into a base band frequency signal.
Figure 10:
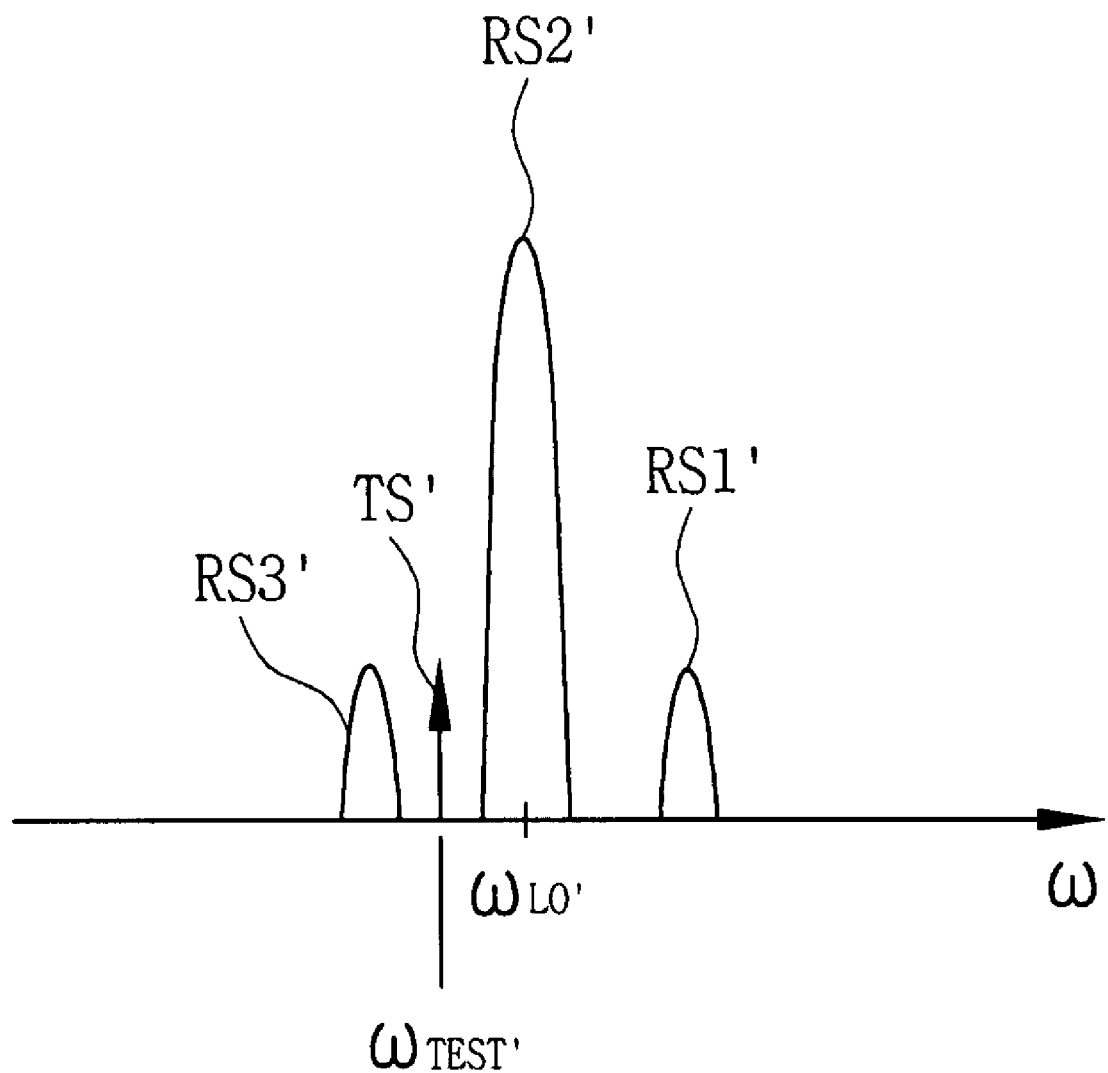
FIG. 10 is diagram illustrating a position of a portion of a received RF signal and a test signal in a frequency domain being inputted into the receiving circuit in accordance with the fourth embodiment of the invention.

FIG. 9 is a diagram illustrating a receiving circuit in accordance with a fourth embodiment according to the invention where an IQ mixer converts a received RF signal into a base band frequency signal. FIG. 10 is diagram illustrating a position of a portion of a received RF signal and a test signal in a frequency domain being inputted into the receiving circuit in accordance with the fourth embodiment.

Referring to FIG. 9, the receiving circuit can include a test signal generator 60', an IQ mixer 10', a quadrature signal generator 11', first and second variable gain amplifiers 20' and 21', first and second analog-to-digital converters 40' and 41', an IQ mismatch detector 70', and an IQ mismatch compensator 71'.

In contrast to the receiving circuit shown in FIG. 2, the receiving circuit shown in FIG. 9 can convert the received RF signal to the base band signal by the IQ mixer 10'.

Therefore, the position of the test signal generated by the test signal generator 60' in the frequency domain may be represented as FIG. 10. RS1' through RS3' denote exemplary portions of the received RF signal, TS' denotes the test signal, $\omega_{LO'}$ denotes angular frequencies of an in-phase signal I' and a quadrature signal Q' inputted to the IQ mixer 10', $\omega_{TEST'}$ denotes an angular frequency of the test signal. As shown in FIG. 10, the test signal TS' can be positioned in the guard band, which is to reduce or prevent the interference between the adjacent received signals. Since the guard band has a relatively small number of received RF signals, a more exact test may be carried out using the test signal TS'. When the test signal TS' is positioned in the guard band that is away from the second received signal RS2' (e.g., the desired signal), most of the test signal TS can be removed by the first and the second band pass filters 30' and 31', and cannot be used by the IQ mismatch detector 70'. Therefore, it is preferable that the test signal TS is positioned in a guard band of the second received signal RS2' (e.g., the desired signal) where a relatively small amount of the test signal TS is removed. Thus, the test signal TS can be in a guard band adjacent to a left, right or the like of the second received signal RS2' that is the desired signal.

In addition, in accordance with the receiving circuit shown in FIG. 9, it is preferable that the first and the second band pass filters 30' and 31' are low pass filters since the received RF signal is converted to the base band signal by the IQ mixer 10'. However, embodiments are not intended to be so limited.

Further, the receiving circuit shown in FIG. 9 does not include the base band converter contrary to the receiving circuit of FIG. 2 since the received RF signal can converted to the base band signal by the IQ mixer 10'. However, since other configurations of the receiving circuit of FIG. 9 are similar to or identical to that of FIG. 2, a detailed description is omitted here.

Figure 11:
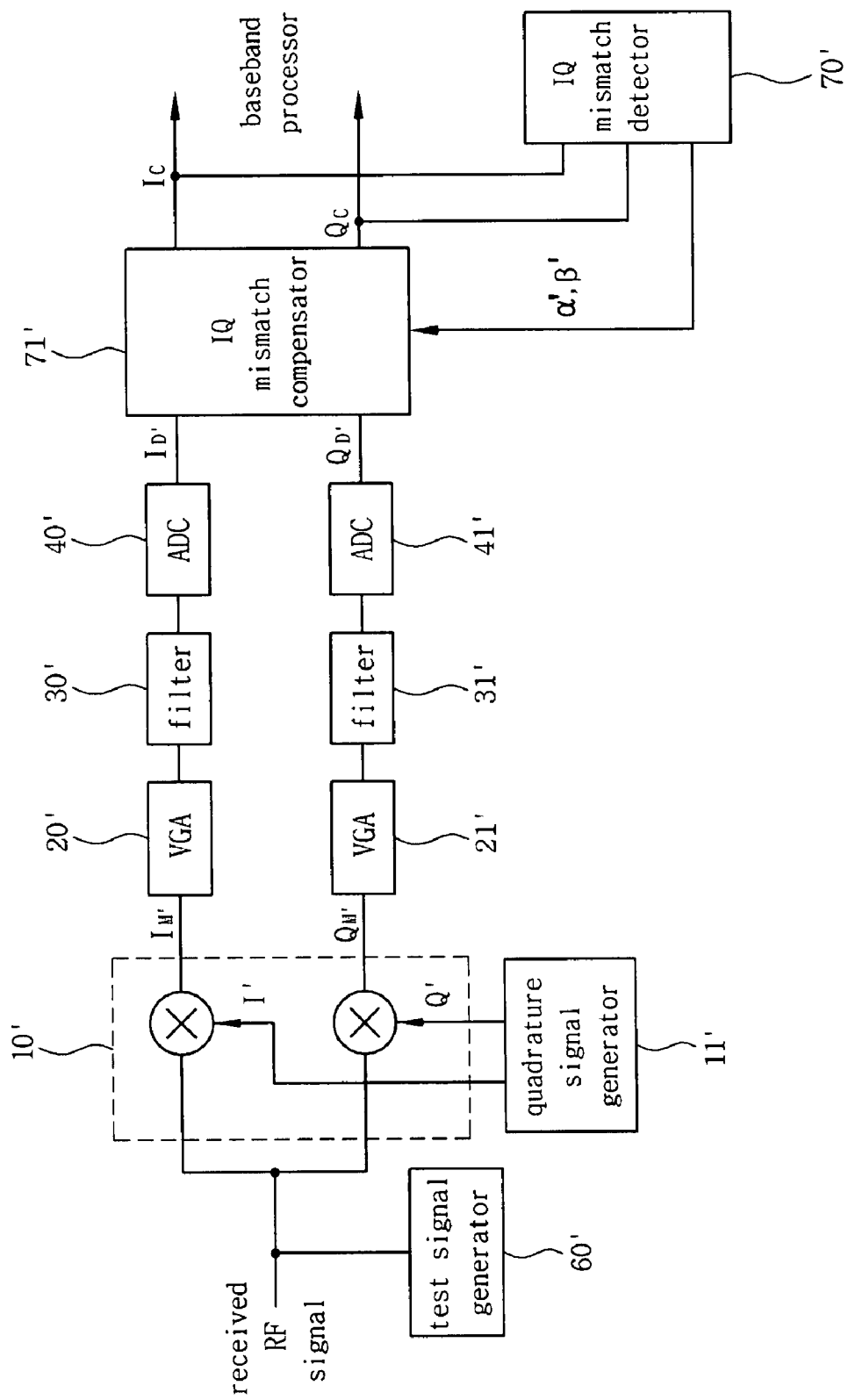
FIG. 11 is a diagram illustrating a receiving circuit in accordance with a fifth embodiment of the present invention.

FIG. 11 is a diagram illustrating a receiving circuit in accordance with a fifth embodiment according to the invention. Contrary to the fourth embodiment where the third signal $I_D'$ and the fourth signal $Q_D'$ are inputted to the IQ mismatch detector 70', a fifth signal $I_C'$ and a sixth signal $Q_C'$ can be inputted to the IQ mismatch detector 70' in accordance with the fifth embodiment. Since other configurations of the receiving circuit in accordance with the fifth embodiment are similar to or identical to that of the fourth embodiment, a detailed description is omitted here.

Figure 12:
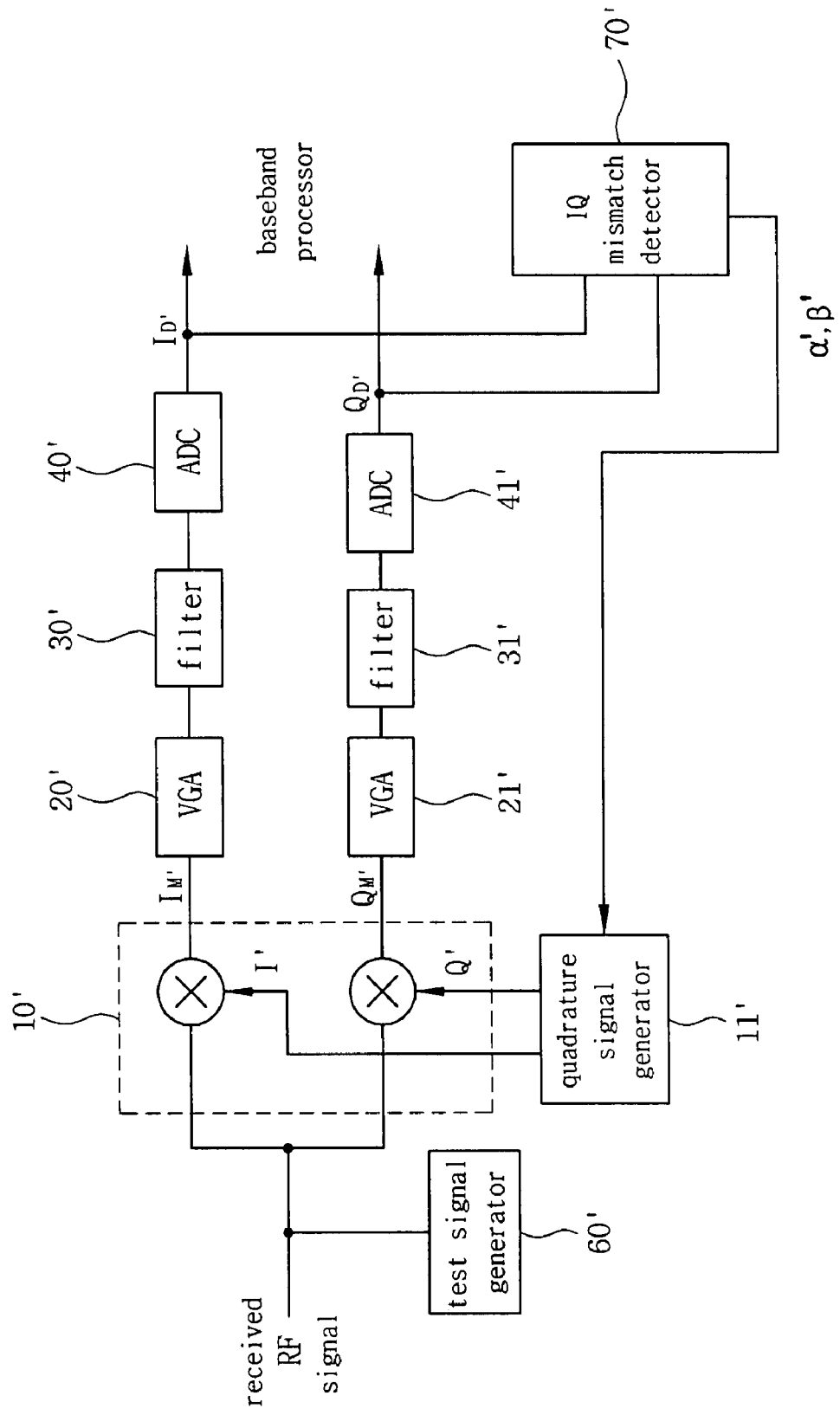
FIG. 12 is a diagram illustrating a receiving circuit in accordance with a sixth embodiment of the invention.

FIG. 12 is a diagram illustrating a receiving circuit in accordance with a sixth embodiment according to the invention. Contrary to the fourth embodiment of where the IQ mismatch is compensated for using the IQ mismatch compensator 71', the IQ mismatch can be compensated for by the quadrature signal generator 11' in accordance with the sixth embodiment. Therefore, in accordance with the receiving circuit of the sixth embodiment, the signals corresponding to the gain error α' and the phase error β' can be transmitted to the quadrature signal generator 11', and the quadrature signal generator 11' can compensate for the gain error α' and the phase error β' of the in-phase signal I' and the quadrature signal Q' according to the signals corresponding to the gain error α' and the phase error β'. Since other configurations of the receiving circuit in accordance with the sixth embodiment are similar to or identical to that of the fourth embodiment, a detailed description is omitted here.

Figure 13:
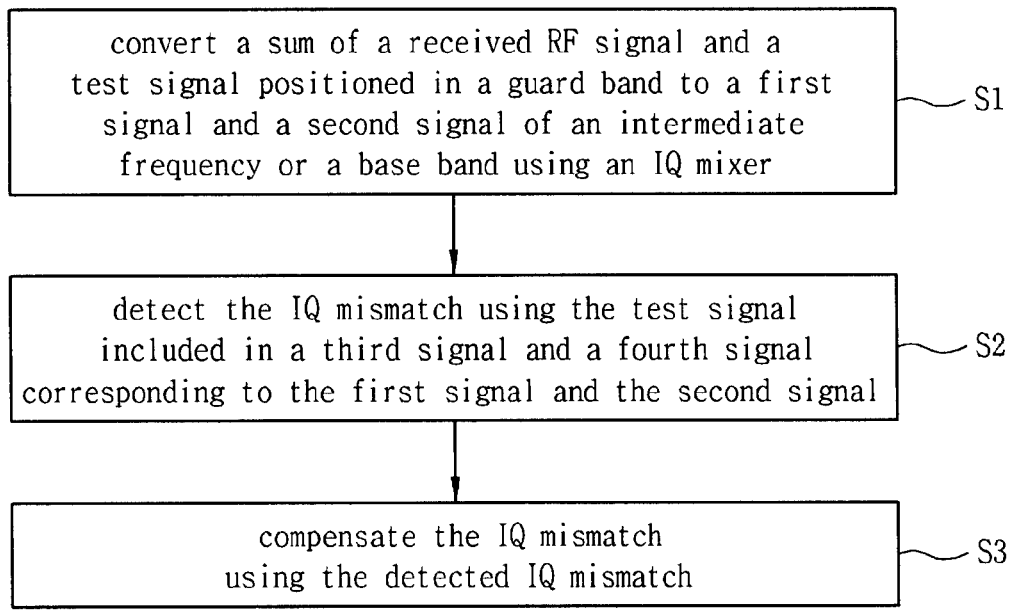
FIG. 13 is a diagram illustrating a method for compensating for an IQ mismatch in accordance with a seventh embodiment of the invention.

FIG. 13 is a flowchart illustrating a method for compensating for an IQ mismatch in accordance with a seventh embodiment according to the invention. As shown in FIG. 13, after a process starts a method for compensating for an IQ mismatch can include converting a sum of a received signal and a test signal positioned in a guard band to a first signal and a second signal of an intermediate frequency or a base band using an IQ mixer (block S1), detecting the IQ mismatch using the test signal included in a third signal and a fourth signal corresponding to the first signal and the second signal (block S2), and compensating for the IQ mismatch using the IQ mismatch detected (block S3).

When the sum of the received RF signal and the test signal positioned in the guard band is converted to the first signal and the second signal of the intermediate frequency (block S1), it is preferable that the received RF signal includes a desired signal and an interference signal for generating an interference interfering with the desired signal by an image because of the IQ mismatch. The test signal may be positioned in a guard band of the interference signal, and an image signal because of the IQ mismatch of the test signal may be positioned in a guard band of the desired signal. In addition, third and fourth signals may be signals obtained by passing the first signal and the second signals through a band pass filter and an ADC. However, embodiments are not intended to be so limited.

In addition, when the sum of the received RF signal and the test signal positioned in the guard band is converted to the first signal and the second signal of the base band (block S1), it is preferable that the test signal is positioned in the guard band of the desired signal. Moreover, the third and the fourth signals may be signals obtained by passing the first signal and the second signals through a low pass filter and the ADC. However, embodiments are not intended to be so limited.

In one embodiment where the IQ mismatch is compensated using the detected IQ mismatch (e.g., block S3), the IQ mismatch compensation may be carried out by controlling the quadrature signal generator that can apply an in-phase signal and a quadrature signal to the IQ mixer (e.g. described with respect to the third and the sixth embodiments). On the other hand, in one embodiment where the IQ mismatch is compensated using the detected IQ mismatch (e.g., block S3), the IQ mismatch compensation may be carried out by obtaining a fifth signal and a sixth signal obtained by compensating for the IQ mismatch of the third signal and the fourth signal (e.g., described with respect to the first and the fourth embodiments).

In accordance detecting the IQ mismatch (e.g., block S2), the gain error and the phase error may be obtained using the image signal due to the IQ mismatch of the test signal included in the third signal and the fourth signal. Such IQ mismatch detection may include converting the test signal included in the third signal and the fourth signal to the signal of the base band, and obtaining the gain error and the phase error from the signal of the base band. The signal of the base band can correspond to an image signal by the IQ mismatch of the test signal. In this case, since the signal of the base band corresponds to the image of the test signal, the signal of the base band has a value corresponding to zero when the IQ mismatch does not occur.

FIG. 14 is a flowchart illustrating a method for compensating for an IQ mismatch in accordance with an eighth embodiment according to the invention. As shown in FIG. 14, a method for compensating for an IQ mismatch can include converting a sum of a received signal and a test signal positioned in a guard band to a first signal and a second signal of an intermediate frequency or a base band using an IQ mixer (block S11), outputting a fifth signal and a sixth signal according to a signal corresponding to a gain error and a signal corresponding to a phase error, wherein the fifth signal and the sixth signal are obtained by compensating for the IQ mismatch the third signal and the fourth signal corresponding to the first signal and the second signal (block S12), and obtaining the signal corresponding to the gain error and the signal corresponding to the phase error using the test signal included in the fifth signal and the sixth signal (block S13).

In one embodiment, the sum of the received signal and the test signal positioned in the guard band can be converted to the first signal and the second signal of the intermediate frequency (block S11), the received signal may include a desired signal and an interference signal for generating an interference interfering with the desired signal by an image caused by the IQ mismatch, the test signal may be positioned in a guard band of the interference signal, and an image signal caused by the IQ mismatch of the test signal may be positioned in a guard band of the desired signal. In addition, third and fourth signals may be signals obtained by passing the first signal and the second signals through a band pass filter and an ADC.

In one embodiment, the sum of the received signal and the test signal positioned in the guard band can be converted to the first signal and the second signal of the base band (e.g., block S11), it is preferable that the test signal is positioned in the guard band of the desired signal. Moreover, the third and the fourth signals may be signals obtained by passing the first signal and the second signals through a low pass filter and the ADC.

Obtaining the signal corresponding to the gain error and the signal corresponding to the phase error (e.g., block S13) may include converting the test signal included in the fifth signal and the sixth signal to the signal of the base band, and obtaining the signal corresponding to the gain error and the signal corresponding to the phase error using the signal of the base band. In this case, since the signal of the base band corresponds to the image of the test signal, the signal of the base band has a value corresponding to zero (substantially zero) when the IQ mismatch does not occur (is reduced).

Methods for compensating for an IQ mismatch in accordance with the seventh and eighth embodiments can be implemented using disclosed embodiments of receiving circuits. However, embodiments are not intended to be so limited.

As described above, embodiments of methods, apparatus and receiving circuits in accordance with the invention have various advantages. For example, IQ mismatch is compensated for after detecting the IQ mismatch of the IQ mixer using a test signal positioned in a guard band.

In addition, in accordance with embodiments, since a test signal positioned in the guard band is used rather than a test signal positioned in a band where a desired signal or an interference signal is positioned, the IQ mismatch of the IQ mixer may be compensated for while the RF signal is being received. Thus, embodiments are capable of reflecting a variation in the IQ mismatch caused by a factor such as a variation in a temperature of the receiving circuit during the reception or the like.

Moreover, in accordance with embodiments, a test signal generated by a test signal generator, which is almost not affected by a noise, can be used rather than using a received RF signal affected by a noise (e.g., generated in a wireless section), which allows a more accurate or an exact detection of the IQ mismatch.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A receiving circuit comprising:
   a test signal generator to generate a test signal positioned in a guard frequency band;
   an IQ mixer to multiply an in-phase signal to a sum of the test signal and a received signal to output a first signal of an intermediate frequency or a base band and to multiply a quadrature signal to the sum of the test signal and the received signal to output a second signal of the intermediate frequency or the base band;
   a first filter and a second filter to respectively receive the first signal and the second signal;
   a first DAC and a second DAC to respectively receive outputs of the first filter and the second filter and to output a third signal and a fourth signal;
   an IQ mismatch detector to detect an IQ mismatch generated by the IQ mixer using the test signal included in the third signal and the fourth signal; and
   an IQ compensator to respectively input the third signal and the fourth signal and output a fifth signal and a sixth signal that compensate the third signal and the fourth signal for the IQ mismatch according to a result obtained by the IQ mismatch detector and transmitted to the IQ compensator.

2. The circuit in accordance with claim 1, wherein the first signal and the second signal are signals of the intermediate frequency,
   wherein the received signal comprises a designated signal and an interference signal to generate an interference with the designated signal responsive to an image by the IQ mismatch;
   wherein the test signal is positioned in a guard frequency band of the interference signal, and
   wherein an image signal responsive to the IQ mismatch of the test signal is positioned in a guard frequency band of the designated signal.

3. The circuit in accordance with claim 2, wherein the first filter and the second filter are band pass filters, respectively.

4. The circuit in accordance with claim 1, wherein the first signal and the second signal are base band signals,
   wherein the received signal comprises a designated signal, and
   wherein the test signal is positioned in a guard frequency band of the designated signal.

5. The circuit in accordance with claim 1, wherein the IQ mismatch detector obtains a signal corresponding to a phase error and a signal corresponding to a gain error using an image signal by the IQ mismatch of the test signal included in the third signal and the fourth signal.

6. The circuit in accordance with claim 1, wherein the IQ mismatch detector comprises:
   a base band converter to convert the test signal included in the third signal and the fourth signal to a signal of the base band; and
   an IQ mismatch output unit to obtain a signal corresponding to a phase error and a signal corresponding to a gain error from the signal of the base band.

7. The circuit in accordance with claim 6, wherein the base band converter is configured to output an image signal by the IQ mismatch of the test signal included in the third signal and the fourth signal as the signal of the base band.

8. The circuit in accordance with claim 1, wherein the IQ mismatch compensator outputs a fifth signal corresponding to $(I_D \times (1-\alpha) + Q_D \times \beta)$ and a sixth signal corresponding to $(Q_D \times (1-\alpha) + I_D \times \beta)$, where $I_D$ is the third signal, $Q_D$ is the fourth signal, $\alpha$ is a gain error and $\beta$ is a phase error.

9. The circuit in accordance with claim 1, comprising a first amplifier and a second amplifier disposed between the IQ mixer and the first filter and the second filter, respectively, wherein the test signal generator comprises a PLL.

10. A receiving circuit comprising:
a test signal generator to generate a test signal positioned in a guard frequency band;
an IQ mixer to multiply an in-phase signal to a sum of the test signal and a received signal to output a first signal of an intermediate frequency or a base band and to multiply a quadrature signal to the sum of the test signal and the received signal to output a second signal of the intermediate frequency or the base band;
a first filter and a second filter to respectively receive the first signal and the second signal;
a first DAC and a second DAC to respectively output a third signal and a fourth signal by receiving outputs of the first filter and the second filter;
an IQ compensator to compensate the third signal and the fourth signal for an IQ mismatch according to a signal corresponding to a phase error and a signal corresponding to a gain error to respectively output a fifth signal and a sixth signal; and
an IQ mismatch detector to detect the signal corresponding to the phase error and the signal corresponding to the gain error using the test signal included in the fifth signal and the sixth signal, wherein the test signal is positioned in a guard frequency band of the interference signal, and wherein an image signal responsive to the IQ mismatch of the test signal is positioned in a guard frequency band of the desired signal.

11. The circuit in accordance with claim 10, wherein the first signal and the second signal are signals of the intermediate frequency, and
wherein the received signal comprises a desired signal and an interference signal to generate an interference interfering with the desired signal responsive to an image by the IQ mismatch.

12. A receiving circuit comprising:
a test signal generator to generate a test signal positioned in a guard frequency band;
an IQ mixer to multiply an in-phase signal to a sum of the test signal and a received signal to output a first signal of an intermediate frequency or a base band and to multiply a quadrature signal to the sum of the test signal and the received signal to output a second signal of the intermediate frequency or the base band;
a first filter and a second filter to respectively receive the first signal and the second signal;
a first DAC and a second DAC to respectively receive outputs of the first filter and the second filter and to output a third signal and a fourth signal;
an IQ mismatch detector to detect an IQ mismatch generated by the IQ mixer using the test signal included in the third signal and the fourth signal; and
a quadrature signal generator to receive the IQ mismatch detected by the IQ mismatch detector and adjust a gain and a phase of the in-phase signal and the quadrature signal according to the IQ mismatch detected by the IQ mismatch detector.

13. The circuit in accordance with claim 12, wherein the first signal and the second signal are signals of the intermediate frequency,
wherein the received signal comprises a prescribed signal and an interference signal to generate an interference with the prescribed signal responsive to an image by the IQ mismatch,
wherein the test signal is positioned in a guard frequency band of the interference signal, and
wherein an image signal responsive to the IQ mismatch of the test signal is positioned in a guard frequency band of the prescribed signal.

14. The circuit in accordance with claim 12, wherein the first signal and the second signal are base band signals respectively,
wherein the received signal comprises a prescribed signal,
wherein the test signal is positioned in a guard frequency band of the prescribed signal, and wherein the IQ compensator is a quadrature signal generator.

15. A method for compensating for an IQ mismatch, comprising:
(a) an IQ mixer to multiply an in-phase signal to a sum of a test signal positioned in a guard frequency band and a received signal to output a first signal of an intermediate frequency or a base band and to multiply a quadrature signal to the sum of the test signal and the received signal to output a second signal of the intermediate frequency or the base band using an IQ mixer;
(b) detecting the IQ mismatch using the test signal included in a third signal and a fourth signal corresponding to the first signal and the second signal; and
(c) compensating for the IQ mismatch using the detected IQ mismatch.

16. The method in accordance with claim 15, wherein the first signal and the second signal are signals of the intermediate frequency,
wherein the received signal comprises a designated signal and an interference signal interfering with the designated signal responsive to an image by the IQ mismatch,
wherein the test signal is positioned in a guard frequency band of the interference signal, and
wherein an image signal responsive to the IQ mismatch of the test signal is positioned in a guard frequency band of the designated signal.

17. The method in accordance with claim 15, wherein the first signal and the second signal are base band signals respectively,
wherein the received signal comprises a designated signal, and
wherein the test signal is positioned in a guard frequency band of the designated signal.

18. The method in accordance with claim 17, wherein the third signal and the fourth signal are signals obtained by respectively passing the first signal and the second signal sequentially through a low pass filter and an ADC.

19. The method in accordance with claim 15, wherein the IQ mismatch is compensated for by controlling a quadrature signal generator for applying an in-phase and a quadrature signal to the IQ mixer.

20. The method in accordance with claim 15, wherein the IQ mismatch is compensated for by obtaining a fifth signal and a sixth signal obtained by compensating for the IQ mismatch of the third signal and the fourth signal.

21. The method in accordance with claim 15, wherein detecting the IQ mismatch comprises obtaining a gain error and a phase error using an image signal by the IQ mismatch of the test signal included in the third signal and the fourth signal.

22. The method in accordance with claim 15, wherein detecting the IQ mismatch comprises:
(b1) converting the test signal included in the third signal and the fourth signal to a signal of the base band; and
(b2) obtaining a gain error and a phase error from the signal of the base band.

23. The method in accordance with claim 22, wherein the signal of the base band corresponds to an image signal by the IQ mismatch of the test signal.

24. A method for compensating for an IQ mismatch, comprising:
  (a) an IQ mixer to multiply an in-phase signal to a sum of a test signal positioned in a guard frequency band and a received signal to output a first signal of an intermediate frequency or a base band and to multiply a quadrature signal to the sum of the test signal and the received signal to output a second signal of the intermediate frequency or the base band using an IQ mixer;
  (b) outputting a fifth signal and a sixth signal according to a signal corresponding to a gain error and a signal corresponding to a phase error, wherein the fifth signal and the sixth signal are obtained by compensating for the IQ mismatch of the third signal and the fourth signal respectively corresponding to the first signal and the second signal; and
  (c) obtaining the signal corresponding to the gain error and the signal corresponding to the phase error using the test signal included in the fifth signal and the sixth signal.

25. The method in accordance with claim 24, wherein the first signal and the second signal are signals of the intermediate frequency,
  wherein the received signal comprises a desired signal and an interference signal interfering with the desired signal responsive to an image by the IQ mismatch,
  wherein the test signal is positioned in a guard frequency band of the interference signal, and
  wherein an image signal responsive to the IQ mismatch of the test signal is positioned in a guard frequency band of the desired signal.

26. The method in accordance with claim 24, wherein the first signal and the second signal are base band signals respectively,
  wherein the received signal comprises a desired signal, and
  wherein the test signal is positioned in a guard frequency band of the desired signal.

* * * * *